United States Patent
Ito (10) Patent No.: US 8,316,798 B2
(45) Date of Patent: Nov. 27, 2012

(54) INDIVIDUALLY MIXED PET FEED SUPPLY SYSTEM

(76) Inventor: Masami Ito, Ashiya (JP)

(*) Notice: Subject to any disclaimer, the term of this patent is extended or adjusted under 35 U.S.C. 154(b) by 867 days.

(21) Appl. No.: 11/814,467

(22) PCT Filed: Jan. 21, 2006

(86) PCT No.: PCT/JP2006/300893
§ 371 (c)(1),
(2), (4) Date: May 12, 2009

(87) PCT Pub. No.: WO2006/077989

PCT Pub. Date: Jul. 27, 2006

(65) Prior Publication Data
US 2009/0299149 A1    Dec. 3, 2009

(30) Foreign Application Priority Data

Jan. 21, 2005  (JP) .................................. 2005-014821

(51) Int. Cl.
G06Q 50/00    (2012.01)
A01K 5/02    (2006.01)
B01F 15/02    (2006.01)

(52) U.S. Cl. ..................... 119/51.02; 700/239; 700/241; 700/244; 705/2; 705/3; 366/150.1; 366/182.1

(58) Field of Classification Search ............... 119/51.02; 705/2, 3; 700/244, 241, 239; 366/150.1, 366/182.1
See application file for complete search history.

(56) References Cited

U.S. PATENT DOCUMENTS

| | | | | |
|---|---|---|---|---|
| 5,737,539 A * | 4/1998 | Edelson et al. | ................... | 705/3 |
| 5,845,255 A * | 12/1998 | Mayaud | ............................ | 705/3 |
| 6,397,190 B1 * | 5/2002 | Goetz | ............................... | 705/3 |
| 7,072,840 B1 * | 7/2006 | Mayaud | ........................... | 705/2 |
| 7,483,839 B2 * | 1/2009 | Mayaud | ............................ | 705/2 |
| 7,606,723 B2 * | 10/2009 | Mayaud | ............................ | 705/2 |
| 8,015,026 B2 * | 9/2011 | Schweisguth et al. | ............ | 705/2 |
| 2003/0212574 A1 * | 11/2003 | Olivier | ............................. | 705/2 |
| 2003/0229452 A1 * | 12/2003 | Lewis et al. | ..................... | 702/19 |

(Continued)

FOREIGN PATENT DOCUMENTS

| | | |
|---|---|---|
| JP | 3344484 | 8/2002 |
| JP | 2004529658 A | 9/2004 |
| JP | 3344484 B2 | 8/2008 |

Primary Examiner — Tony G Soohoo
(74) Attorney, Agent, or Firm — Lowe, Hauptman, Ham & Berner, LLP (57) ABSTRACT

It used to be difficult to automatically mix—together with ordinary pet foods—nutrients and medications as additives based on a prescription from an animal hospital according to the condition of a pet. Also, it was not easy to submit from a personal computer or a mobile phone an order for custom-mixed pet food. This system easily receives, via the Internet from a personal computer 1 or a mobile phone 2, an order for custom-mixed pet food based on a prescription sent to a custom-mixed-pet-food prescription control computer system 4 that electronically controls a mixing device 5 that automatically produces custom-mixed pet food according to mixing data specified by an pet owner's order and prescription from an animal hospital. The system comprises a pet-owner-user's personal computer 1, a mobile phone 2, the Internet 9, a custom-mixed-pet-food prescription control computer system 4, a computer 3 of an animal hospital, a Web server 4a, an application server 4b, a database server 4c, a stored data input/output processing management terminal 4d, an interface circuit 4e, and a mixing device 5.

6 Claims, 4 Drawing Sheets

Each connected to the electronic-control terminal of the respective motor of a mixing device 5

U.S. PATENT DOCUMENTS

| | | | |
|---|---|---|---|
| 2004/0019567 A1* | 1/2004 | Herceg et al. | 705/64 |
| 2005/0032034 A1* | 2/2005 | Dodds | 435/4 |
| 2006/0074718 A1* | 4/2006 | Fucci et al. | 705/3 |
| 2006/0200320 A1* | 9/2006 | Al-Murrani | 702/20 |
| 2007/0118295 A1* | 5/2007 | Al-Murrani | 702/19 |
| 2008/0228519 A1* | 9/2008 | Leon | 705/2 |
| 2008/0275311 A1* | 11/2008 | Haq | 600/300 |
| 2010/0161353 A1* | 6/2010 | Mayaud | 705/3 |
| 2012/0041778 A1* | 2/2012 | Kraft | 705/2 |

\* cited by examiner

Fig. 1

Each connected to the electronic-control terminal
of the respective motor of a mixing device 5

(a) Plane view (b) X–X cross-sectional view (c) Y–Y cross-sectional view

Fig. 4

(a) Enlarged cross-sectional view along lines Y–Y and X–X of Figure 3

(b) Z–Z cross-sectional view

INDIVIDUALLY MIXED PET FEED SUPPLY SYSTEM

CROSS-REFERENCE TO RELATED APPLICATIONS

The present Application is based on International Application No. PCT/JP2006/300893, filed on Jan. 21, 2006, which in turns corresponds to Japanese Application No. 2005-014821 filed on Jan. 21, 2005, and priority is hereby claimed under 35 USC §119 based on these applications. Each of these applications are hereby incorporated by reference in their entirety into the present application.

FIELD OF THE INVENTION

The present invention relates to a system for supplying custom-mixed pet food. The system (1) receives, via the Internet, a pet owner's request for pet food that is to be custom-mixed according to data, also obtained via the Internet, from an animal hospital after diagnosis of the pet's condition based on the pet's age, size, and type and extent of any disease(s) afflicting the pet, (2) enters that data in a pet-food mixer, and (3) automatically produces custom-mixed pet food that includes the nutrients or medications appropriate for the particular pet.

BACKGROUND OF THE INVENTION

Conventionally, pet foods have been prepared and provided by adding various additives to foods. When the pet foods are selected, many factors, such as the type of pet, as well as its activity level, medical history, breed, sex, and age, are considered, and when selecting additives for a pet food, many substances, such as meat juice, sauces, coatings, nutrients such as vitamins, and medications, are considered.

Japanese Patent Application Laid-Open No. 2004-529658 pages 2, 3, and 4, and FIG. 1 discloses that the above-mentioned considerations when custom-mixing and providing pet foods. However, a device for automatically producing pet-food that is custom-mixed and that includes medicinal ingredients prescribed according to the health and medical condition of an individual pet has rarely been described. Because there are a great many kinds of preparations of pet foods and additives, they are individually selected manually when preparing a pet food. Thereafter, the selected pet foods and additives are made into a mixed pet food by using a preparing machine or a mixer. That is to say, the conventional method of preparing pet foods involves inefficient manual operation.

Patent Document 1: Japanese Patent Application Laid-Open No. 2004-529658 (pages 2, 3, and 4,and FIG. 1)

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTIONS OF THE DRAWINGS

The present invention is illustrated by way of example, and not by limitation, in the figures of the accompanying drawings, wherein elements having the same reference numeral designations represent like elements throughout and wherein:

FIG. 3(a) is a plane view, FIG. 3(b) is a cross-sectional view along the line X-X, and FIG. 3(c) is a cross-sectional view along the line Y-Y.

FIG. 4(a) shows a cross-sectional view along the lines Y-Y and X-X of FIG. 3, and FIG. 4(b) is a cross-sectional view along the line Z-Z of FIG. 4(a).

EXPLANATION OF NUMBERS USED IN THE DRAWINGS

1 personal computer terminal of a user who owns a pet
2 mobile phone terminal of a user who owns a pet
3 computer of an animal hospital
4 custom-mixed-pet-food prescription control computer system
4a Web server
4b application server
4c database server
4d management terminal
4e interface circuit with a mixing device (including A/D and D/A)
4g pet-food-order accepting means
4h pet-food-order-entry/prescription-request transmission means
4i pet-owner referral/prescription-request transmission means
4j prescription/mixed-food data-transmission means
4k custom-mixed-food completion-notification means
4l iris-information-diagnosis means
4m blood-test-data diagnosis means
4P user membership database
4Q animal-hospital membership database
4R order-form database
4S diagnosis-data-prescription database
5 mixing device
10 ingredient container (food or nutrient or medication container)
1x (11 to 14) sections of ingredient container
1xa (11a to 14a) partition plates
1xb (14b) outlet pipes
1xc spiral blade
1xn electronically controlled motor for sliding partition plates
1xm electronically controlled motor for transferring ingredients
1xp separated-ingredient chamber
1xs sensor
20 mixing mechanism
20a comb-like blade
20m electronically controlled (comb-like blade) rotary motor
20t ingredients-transfer port
20x electronic-controls terminal
20z pet-food outlet port
30 pet-food bag
100 various nutrient and medication containers
10x (101-117) container sections
10xa (101a-117a) partition plates 10xb (101b-117b) ingredients outlet pipes
10xc spiral blade
10xm electronically controlled motor for transferring ingredients
10xn electronically controlled motor for sliding partition plates
120 nutrients/medications-transfer mechanism
120a spiral blade
120m electronically controlled (spiral blade) rotary motor
120t nutrients/medications-transfer port
120x electronic-controls terminal
120z nutrients/medications-transfer port
L slide rail

SUMMARY OF THE INVENTION

The present invention is made in light of the above-mentioned problems, and one objective of the present invention is to provide a system that (1) receives tailored orders, including medicinal prescriptions, for pet food corresponding to a pet's condition, such as the pet's health condition, age, and breed, (2) automatically produces, by using a mixing device, a mixed pet food that is custom-mixed according to the particular pet's condition, with the pet food consisting of food ingredients, nutrients, and medication(s) based on the pet-owner's order and medicinal prescription data, and (3) is easy for a pet owner to use, and (4) enables a pet-food producer to efficiently produce the mixed pet food.

To achieve the above-mentioned objective, the system for supplying custom-mixed pet food for mixing, with granular dried food, granular processed nutrients and medication(s) corresponding to the size, health condition, and so on of a pet, includes a pet owner's communications terminal, which is a personal computer (1) or a mobile phone (2), a computer of an animal hospital (3) to which the pet owner has been referred by someone, or an animal hospital (3) to which the pet owner regularly takes his/her pet, and a mixing device (5) for mixing the nutrients and medications with food, and A custom-mixed-pet-food prescription control computer system (4) has at least a food-order accepting means (4g), which receives via the Internet from the pet owner's communications terminal a request for supplying custom-mixed pet-food, and which transmits an online order form to the pet owner's communications terminal. A pet-food-order-entry/prescription-request transmission means (4h), which receives the online order form into which order data is entered from the pet owner's communications terminal, records the order data in a database, and transmits a prescription-entry form having a predetermined format and containing a list of nutrients and/or medication(s) to be mixed with food to a computer of a hospital specified in the online order form if the pet owner regularly takes the pet to a particular animal hospital.

A pet owner referral/prescription-request transmission means (4i) transmits, if the pet owner does not regularly take the pet to any animal hospital—a letter-of-referral form that refers the pet owner to a hospital selected by the pet owner, with the prescription-entry form having a predetermined format to be completed when the pet owner and his/her pet visit the hospital—to a computer of a hospital selected from a list of animal hospitals on the online order form.

A prescription/mixed-food data-transmission means (4j) (a) reads—when receiving the prescription-entry form having a predetermined format for data entry from the animal hospital that the pet owner regularly visits or to which the pet owner has been referred by the online order form—selection check marks in respective item spaces at predefined positions of the prescription, then (b) records data relating to the kind and weights of the nutrients and/or medication(s) to be mixed with food by converting the data into data value, and then (c) transmits the data value to the mixing device via a LAN line, resulting in the manufacture of the custom-mixed pet food based on the data value. In such a system for supplying custom-mixed pet food, the mixing device includes a mixing mechanism that rotates a rotary comb-like blade in normal and reverse directions for mixing, various food containers, from which food is put into input ports provided at the top of said mixing mechanism after food is electronically selected according to a database record based on pet-food order, a transfer mechanism that transfers the nutrients and medications to mixing mechanism by a rotary spiral blade or an extrusion plunger, and various nutrient and medication containers, from which designated nutrients and/or medications are put into input ports provided at the top of the transfer mechanism after being electronically selected according to a database record based on the prescription.

Also, the system for supplying custom-mixed pet food has the various food containers housing food by classifying the same by type, including a slide mechanism provided to each container at a predetermined position from the bottom of the container, allowing a partition plate to move slidably by electronic control. The plate is inserted into and out of the container, so as to separate a predetermined weight/amount of the respective food, and a transfer mechanism for electronically controlling the rotation of the spiral blade so as to discharge the separated food from the respective container to outside, and the various nutrient and medication containers housing nutrient and medication by classifying the same by type, including a slide mechanism provided to each container at a predetermined position from the bottom of the container, allowing a partition plate to move slidably by electronic control, the plate being inserted into and out of the container, so as to separate a predetermined weight/amount of the respective nutrient and medication, and a transfer mechanism for electronically controlling the rotation of the spiral blade so as to discharge the separated nutrient and medication from the respective container to outside, and with the rotation-controlling electronic terminals of the mixing mechanism and the transfer mechanism, and the electronic control terminals of electronically controlled slide mechanism and the transfer mechanism of the respective container of nutrient, medication and food, being connected with an interface circuit of the custom-mixed-pet-food prescription control computer system, and the requested custom-mixed pet food being automatically created in response to food data and prescription data transmitted from the custom-mixed-pet-food prescription control computer system.

Also, it is preferable that the predetermined format of nutrient/medication prescription data includes places for recording and attaching data of a video-camera system that records the condition of the pet's irises and the physical functioning of the pet, the output data of the iris-condition video-camera system in the animal hospital is entered and transmitted to the custom-mixed-pet-food prescription control computer system; and the prescription for nutrients and/or medication(s) according to the condition or symptoms of the individual pet is automatically selected by an iris-information diagnostic means of the custom-mixed-pet-food prescription control computer system that receives the iris-condition information and then is recorded in the computer system's database.

It is preferable that the predetermined format for the nutrient/medication prescription data includes places for recording the blood-test data of the pet, the blood-test data entered by the animal hospital is transmitted to the custom-mixed-pet-food prescription control computer system, and the nutrient(s) and/or medication(s) prescribed according to the condition or symptoms of the individual pet is/are automatically selected by the blood-test-information diagnostic means of the custom-mixed-pet-food prescription control computer system that receives the data, and is/are recorded in the computer system's database.

The present invention has the following effects.

A user who owns a pet sends, via the Internet from a personal computer or a mobile phone, to the custom-mixed-mixture-control computer system, an order for pet food that is to be made by including nutrients and/or medications suitable for that pet, and the control computer system automatically accepts that order.

The control computer system also can automatically submit to the animal hospital at which a user's regular veterinarian works and which hospital's name is entered on an online order form, a request—in the format required for the custom-mixed-mixture-control computer system—for the prescription to be used for the custom-mixed pet food, and then receive the prescription from the animal hospital.

If the user does not regularly take the pet to a specific animal hospital, a referral to an animal hospital can be specified on the online order form. The control computer system can then automatically request a prescription from the animal hospital specified by the user on the order form, and can receive a prescription based on the diagnosis of the pet after it has been brought to the animal hospital.

The format of the order form is constant, as is the list of selection items such as data concerning required nutrients and/or medications. After the order is received by the control computer system it is transmitted from the control computer system to a mixing device via a LAN line, so that the desired custom-mixed pet food, in which the designated and selected nutrients and/or medications are blended, can be automatically created.

The output data of the animal hospital's video-camera system for recording the condition of the pet's irises is entered and transmitted, and prescription data is automatically created by the iris-information diagnostic means of the individual prescription-management computer receiving the iris-condition data, so that the animal hospital's labor required for diagnosis and prescription can be further reduced.

The blood-test-results data entered by the animal hospital is transmitted to the custom-mixed-pet-food prescription control computer system, and prescription data is automatically created by the blood-test-results diagnostic means of the individual prescription-management computer receiving the blood-test-results data, so that the animal hospital's labor required for diagnosis and prescription can be further reduced.

DETAILED DESCRIPTION OF THE INVENTION

Now, the best modes of the present invention's system for supplying custom-mixed pet food will be explained with reference to the drawings.

Figure 1:
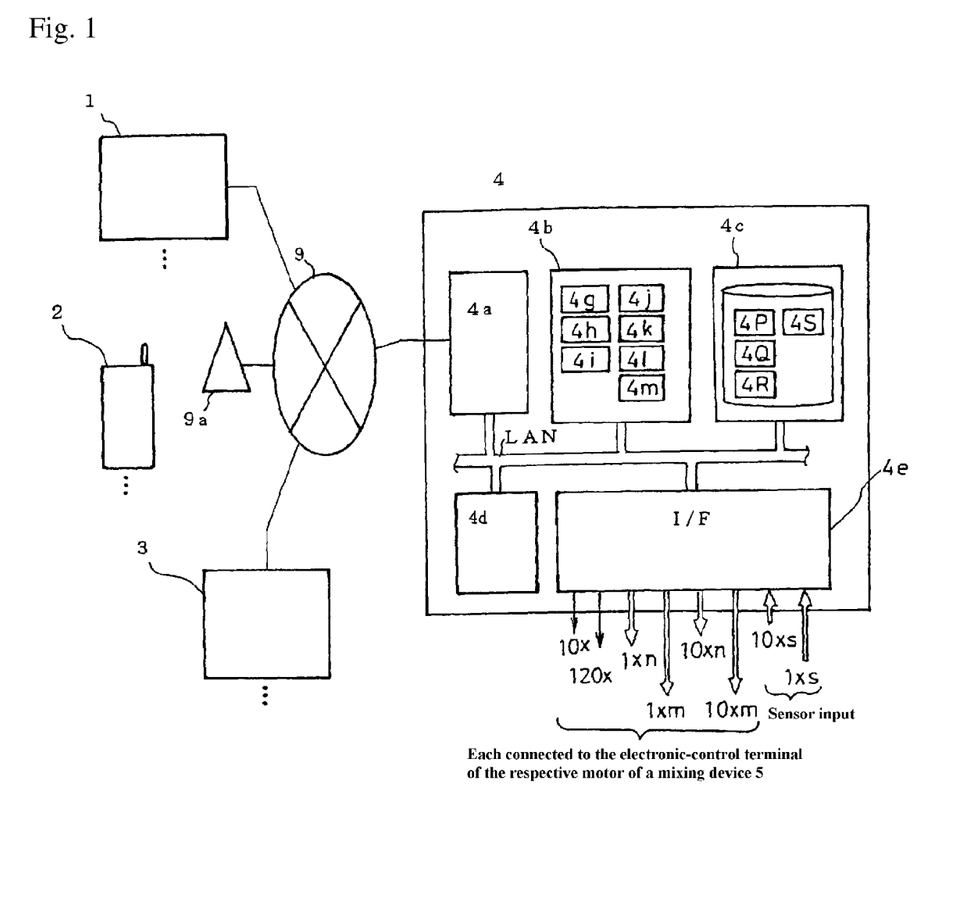
FIG. 1 shows the constitution of the present invention's system for supplying custom-mixed pet food.

FIG. 1 is a diagram of the present invention's system for supplying custom-mixed pet food. Here, 1 denotes a personal computer of a pet-owner user of this system, and 2 denotes a mobile phone of the user. The terminals 1 and 2 of the pet owner can be connected to a custom-mixed-pet-food prescription control computer system 4 via the Internet 9 so as to order a custom-mixed pet-food mixture. Also, 9a denotes a wireless base station of the company that provides the user's mobile phone service, which also is connected with the Internet.

Also, 3 denotes a computer of an animal hospital to which the user of the system regularly takes his/her pet, or a computer of an animal hospital to which the user can be referred.

Now, the configuration of the custom-mixed-pet-food prescription control computer system 4 will be explained. In FIG. 1, 4a denotes a Web server, 4b denotes an application server, 4c denotes a database server, 4d denotes a saved-data input/output processing-management terminal, and 4e denotes an interface circuit unit that includes A/D and D/A converters and that is interfaced with a mixing device 5 (not shown in FIG. 1).

The custom-mixed-pet-food prescription control computer system 4 is connected to the mixing device 5 by, at least, input terminals 10x, 120x, 10n, 100n, 10b and 100b, and motors used on the mixing device 5 can be respectively rotated either forward or in reverse by positive or negative currents sent from a direct-current power source.

Figure 2:
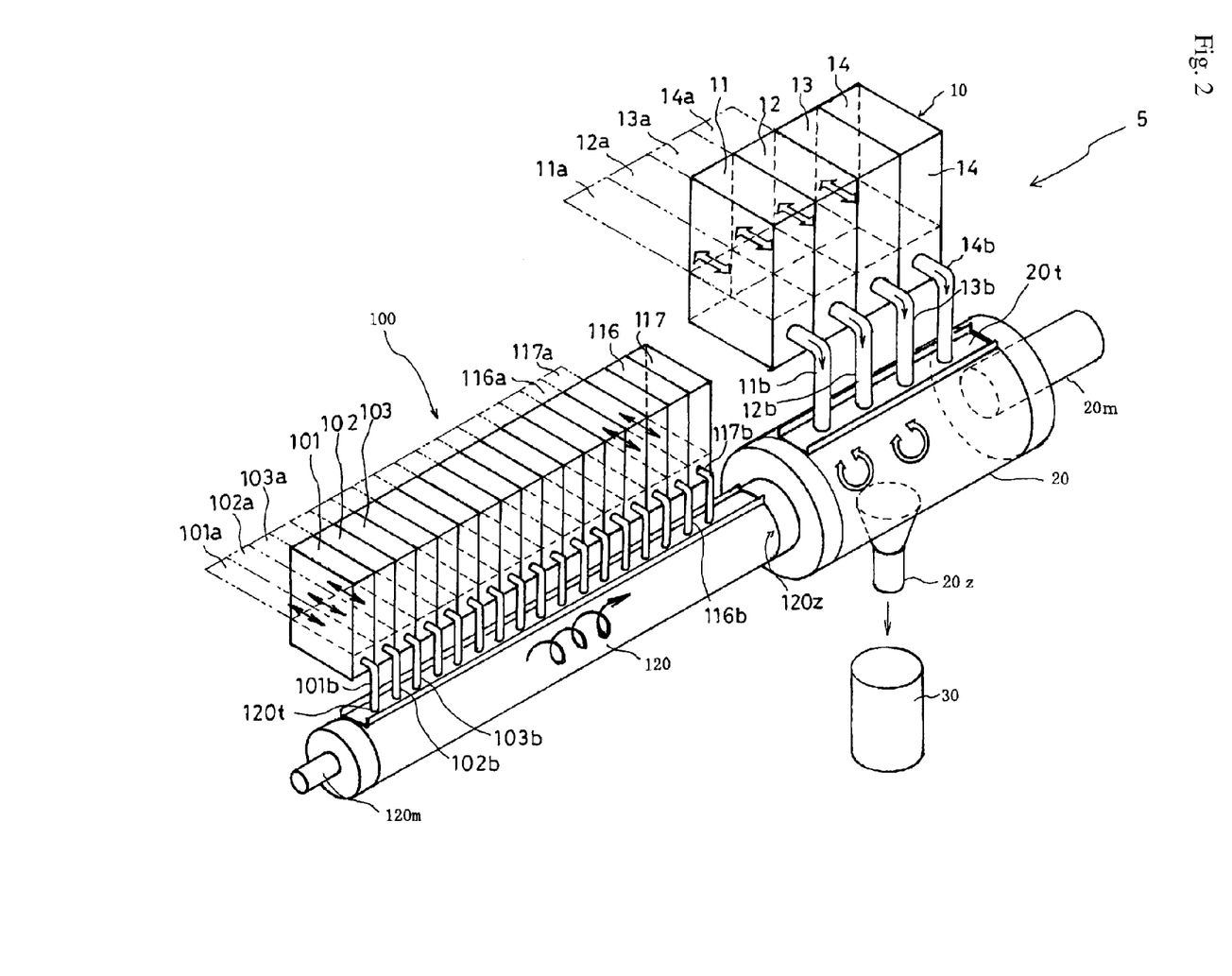
FIG. 2 is a perspective view showing an outline of the present invention's structure of a device for mixing granular nutrients and medications with granular foods.
Figure 3:
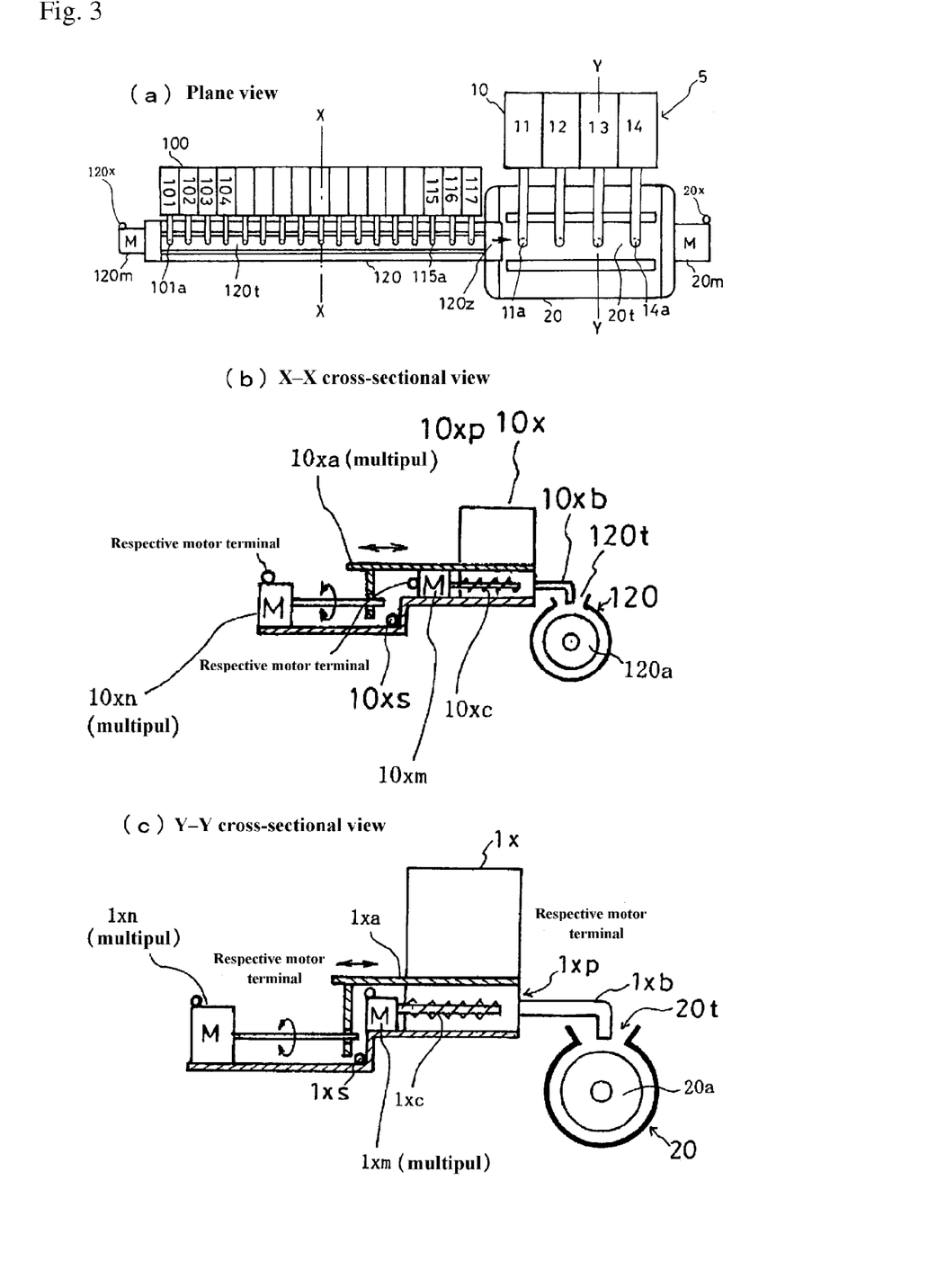
FIG. 3 shows the structure of the present invention's device for mixing granular nutrients and medications with granular foods.

FIGS. 2 and 3 show detailed views of the mixing device 5. FIG. 2 is a perspective view showing an outline of the structure of the mixing device 5, FIG. 3 shows the structure of the mixing device 5, FIG. 3(a) is a plane view thereof, FIG. 3(b) is a cross-sectional view along the line X-X, and FIG. 3(c) is a cross-sectional view along the line Y-Y.

In FIGS. 2 and 3, 10 denotes a container having multiple sections that separately house commercial or specially prepared pet-food ingredients that are processed as granules. Although pet-food ingredients can be processed in any shape, such as granules, chips (flakes), rods, lumps, and powder, it preferable that the ingredients are dried, processed granules.

Part 1x (11 to 14) is one example showing four container sections. Part 1xa (11a to 14a) shows partition plates that are slidably installed in the several container sections x. Hereinafter, the above-mentioned alpha-numeric identifiers will be presented in parentheses, as "1x (11 to 14)" and "1xa (11a to 14a)," respectively.

A slide rail L is located at a predetermined height from the bottom of each container section, and the partition plate 1xa is pressed horizontally in the direction of the slide rail L by the normal, forward operation of an electronically controlled motor 1xn for sliding the partition plates. As a result, a space of constant capacity is formed on the bottom of the container 1x. A spiral blade 1xc rotates along the bottom of this separated space, so that the food ingredients in this separated space are moved forward in the horizontal direction.

The spiral blade 20a moves the food ingredients forward in the horizontal direction by the normal, forward operation of an electronically controlled transferring motor 1xm, and extrudes the ingredients to outlet pipes 10b (11b to 14b) located at the outlet of the container section 1x. Then, the foods are extruded to the outlet pipes 10b (11b to 14b) located at the outlet of the container section 1x.

Also, when the motor 1xm rotates reversely or stops, extrusion stops. Also, the spiral blade is a rotary shaft having a predetermined spiral curve. It can have a structure with multiple spiral curves.

Meanwhile, when the motor 1xn is operated in reverse, the partition plate 1xa is withdrawn from the container section 1x along the slide rail L.

The actions of each of the container sections 1x of the food ingredients container 10 are as follows.

First, preparation is done in advance such that the container section 1x contains sufficient food ingredients or nutrient/medication before the partition plate 1xa is withdrawn from the container section 1x.

Then, in each container section 12, the electronically controlled motor 1xn for sliding the partition plates is operated normally, and the partition plate 1xa is closed so that there is formed a separated-ingredient chamber 1xp in which is separated a portion of the bottom layer of the food ingredients. The food ingredient or nutrient/medication in a separated-ingredient chamber 1xp should be of a predetermined volume whose weight is measured in advance so as to create a volume-to-weight conversion file in which the volume of the food ingredient or the dosage amount of the nutrient/medication is converted into an appropriate weight. The position of the slide rail is predetermined so that the weight/amount of the ingredients that is separated into the separated-ingredient chamber 1xp corresponds to a predetermined frequency or predetermined number of meals.

As shown in the drawings, the motor 1xn for sliding the partition plates receives normal-operation signals from the application server 4b via the interface circuit 4e, and the partition plate 1xa is extruded along the slide rail and through the food ingredients, thereby separating a predetermined portion of the ingredients. A stopping sensor 1xs senses when the front end of the partition plate 1xa contacts the wall of the container section 1x, and when the application server 4b receives, via the interface circuit 4e, signals regarding that contact, the application server 4b stops the normal, forward operation of the motor 1xn for sliding the partition plates, so as to stop the movement of the partition plate 1xa.

Here, when the electronically controlled motor 1xm for transferring ingredients is in normal, forward operation, food ingredients of a predetermined weight, which are housed in the separation chamber 1xp, are discharged to the outside of the separation chamber 1xp through the outlet pipe 1xb.

A program in the application server 4b is run to repeat the above-mentioned steps according to the number of days or times specified by the pet owner.

Also, as shown in FIG. 3(c), the spiral blade 1xc is arranged at the center of the separated-ingredient chamber 1xp, which is separated as the bottom layer of the container section 1x by the partition plate 1xa. Specifically, it is desirable that, as shown in FIG. 4, the bottom of the separated-ingredient chamber 1xp is formed so as to be approximately a half of the cylindrical curved surface that concentrically surrounds the bottom of the spiral blade 1xc and so that all the food ingredients in the separated-ingredient chamber 1xp are completely discharged to the outside.

FIGS. 2 and 3 further show several nutrient/medication containers 100, and numerous container sections 10xa (101a to 117a) thereof. In this embodiment, there are 17 container sections 10xa. Granular nutrients and medications, which are prepared in advance are housed in their respective container sections 10xa, and the identification number of each of these container sections is recorded in a database.

Each of the container sections 10xa has 17 partition plates 10xa, each of which is slide by its own electronically controlled slide motors 10xn, as is similar to the above-mentioned food ingredient container 10, and has 17 spiral blades 10xc, each of which is rotated by the electronically controlled slide motor 10xn.

Figure 4:
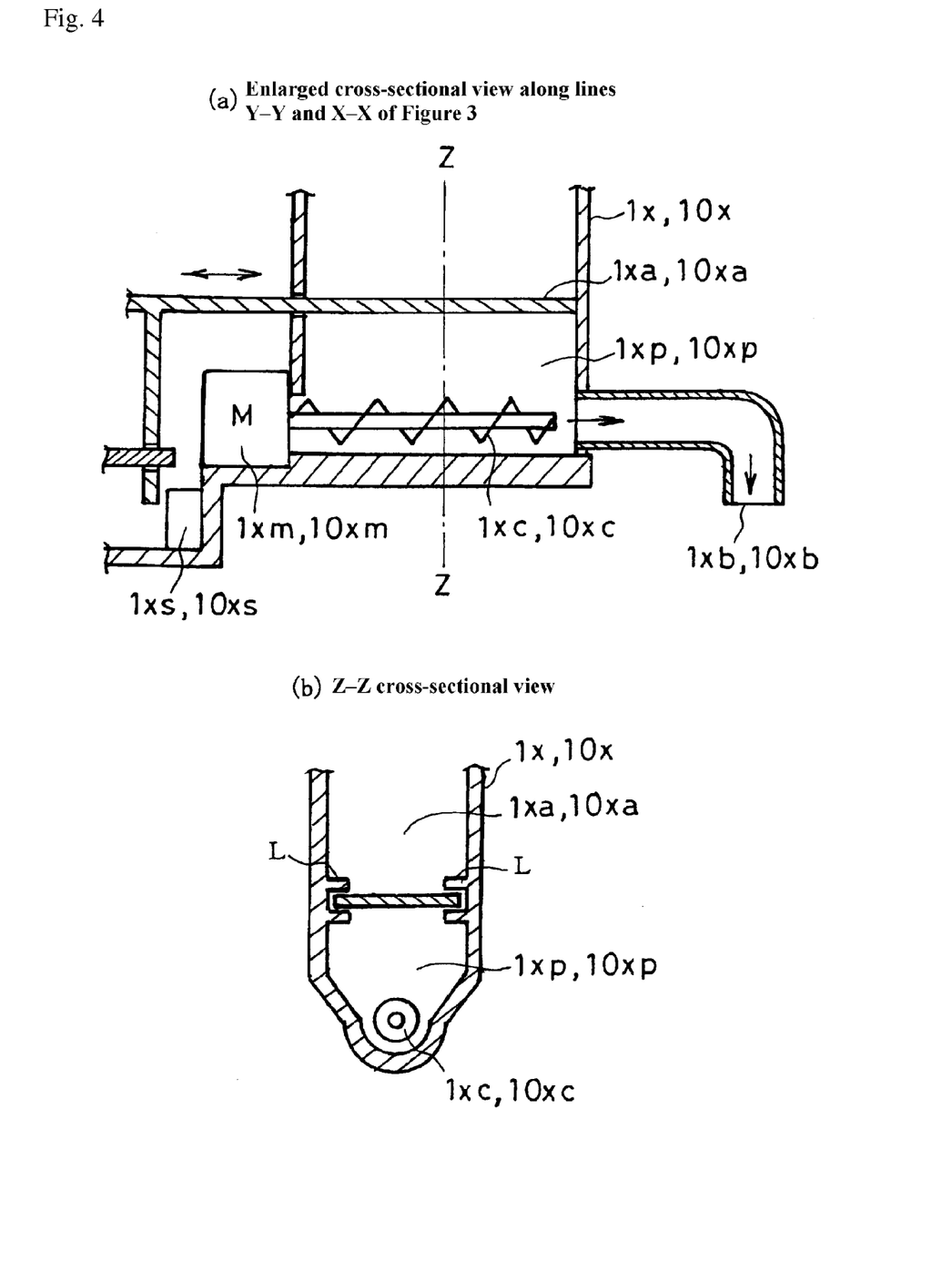
FIG. 4 shows a detailed structure of the spiral blade and separation chamber of an electronically controlled motor for transferring ingredients.

A detailed view of one of the 17 separated-ingredient chamber 10xp, including its spiral blade 10xc and other related elements, is shown in FIG. 4. Also, the vertical position of the slide rail L is made to correspond to the weight of the ingredients to be supplied and can be changed according to amount of the ingredient to be discharged.

The above-mentioned container 100 is different from the above-mentioned container 10 only in terms of the number of its sections and the size of the container overall, and has a mechanism similar to that of the container 10. Therefore, an explanation of the actions of the container 100 will be omitted.

Next, the mixing mechanism 20 accepts, through its ingredients-transfer port 20t, the designated ingredients, which are automatically selected—from the food ingredient container 10 on the basis of the prescription data—by electronic control (control by the custom-mixed-pet-food prescription control computer system 4).

Meanwhile, a transfer mechanism 120 accepts—through its nutrients/medications-transfer port 120t, one or more nutrients and/or medications, which are automatically electronically selected from the nutrient and medication container 100 on the basis of the prescription data—then rotates a spiral blade 120a via an electronically controlled rotary motor 120m, and then transfers the nutrients and/or medications to the mixing mechanism 20.

The transferred nutrients and/or medications enter the mixing mechanism 20 through the nutrients/medications-transfer port 120z.

The nutrients and medications are mixed with the food ingredients that have already been inserted into the mixing mechanism 20 through the ingredients-transfer port 20t. That is to say, a rotatable comb-like blade 20a is installed at the center of the mixing mechanism 20, and an electronically controlled rotary motor 20m operates to cause the comb-like blade 20a to mix the foods with the nutrients and/or medications. After a predetermined time has elapsed, the outlet port 20z is opened, and custom-mixed pet food of a weight required for predetermined number of feedings or days are discharged into a pet-food bag 30, which is then sealed.

Referring to FIG. 1 again, the actions of the system for supplying custom-mixed pet food will be explained.

When an request to order custom-mixed pet food is submitted to the custom-mixed-mixture-control computer system 4 via the Internet 9 from the personal computer 1 or mobile phone 2 of a pet-owner user of this system, the custom-mixed-pet-food prescription control computer system 4 processes that request, using a program of a food-order accepting means 4g in the application server 4b via the Web server 4a.

The food-order accepting means 4g receives the aforementioned request to order via the Internet 9 from the pet-owner's terminal 1 or 2, and in response transmits an online order form to the terminal 1 or 2.

More particularly, when the request to order is received, a membership database 4P is searched to check whether the pet owner who is submitting the request to order is listed in the membership database 4P. If that pet owner is not listed in the membership database 4P, the food-order accepting means 4g prompts that person to register his/her name, after which the food-order accepting means 4g provides the non-member pet owner with a member ID number, and subsequently transmits to that new member an online order form that already exists in the system's database 4R. The order form's format includes spaces in which to enter each of the following: the pet-owner's name; member-ID number; information concerning the pet; the name of the animal hospital to which the pet owner takes the pet; and, if the pet owner does not regularly take the pet to a particular animal hospital, a check mark to select an animal hospital, from a list of animal hospitals, to which the pet owner will be referred by the enterprise operating the custom-mixed-pet-food prescription control computer system 4.

A pet-food-order-entry/prescription-request-transmission means 4h receives from the food-order accepting means 4g a completed online order form and records the information from that form in the user membership database 4P, and—if the order form specifies an animal hospital to which the pet owner takes the pet—transmits to the computer 3 of the animal hospital a prescription-entry form that has a predetermined format and on which the hospital is to prescribe nutrients and/or medications to be mixed into pet food to be provided.

Also, the pet owner can select an animal hospital by entering in the online order form a check mark next to the name of a desired animal hospital in a column that lists a number animal hospitals with which the enterprise operating the custom-mixed-pet-food prescription control computer system 4 has a contract, in which case the selected animal hospital will automatically be recognized by the custom-mixed-mixture-control computer system 4 based on where the check mark has been entered.

A pet owner referral/prescription-request transmission means 4i receives the order form on which data has been entered. If the data entry space for specifying the animal hospital to which the user regularly takes the pet has no data, the pet owner referral/prescription-request transmission means 4i automatically recognizes the animal hospital to which the pet-owner user wants to be referred, based where the user has entered a check mark in the animal-hospital referral-request column, and then transmits the aforementioned prescription-entry form to the computer 3 of the designated animal hospital.

The prescription entry form—which is in a predetermined format—of the pet owner referral/prescription-request transmission means 4i is stored in advance in various entry-form databases 4R in the database server 4c. This format will be explained below.

The prescription-entry form for the prescription to be requested from the animal hospital is stored in the database 4R. This form includes a column that lists the ingredients, nutrients, and medications that are stored by the enterprise that operates the custom-mixed-pet-food prescription control computer system 4 and that can be individually selected and specified in the prescription to be sent from the animal hospital. The prescription-entry form also includes spaces for the pet owner's name, the pet-owner's membership number, and information concerning the pet. The designated ingredients, nutrients, and medications to be prepared are specified according to the positions of the check marks entered on the form, and then the prescription data is transmitted to the mixing device 5.

This embodiment includes a prescription/ingredients-data transmission means 4j. When the prescription/ingredients-data transmission means 4j receives the prescription-entry form either from the above-mentioned animal hospital to which the pet owner regularly takes the pet or from the animal hospital selected by the user via the referral-request column on the online pet-food order form, the prescription/ingredients-data transmission means 4j (1) reads the selection check marks in the prescription-items column, (2) records in the databases 4P and Q the data relating to the kinds and volumes of the nutrients and/or medications to be include in the custom-mixed pet food, and (3) transmits the data to the mixing device 5 via a LAN line and via a interface circuit 4e that includes A/D and D/A converters, after which the mixing device 5 automatically creates a custom-mixed pet food based on the data received.

Also, the custom-mixed-pet-food prescription control computer system 4 the signals notifying that preparation of the custom-mixed pet food has been completed, and that then proceeds to start a mixing action for the next order for custom-mixed pet food.

Furthermore, the predetermined format for the nutrient/medication prescription data has spaces for recording and attaching data from a video camera system that records as image data concerning both the condition of a pet's irises and the pet's physical functioning.

When the record of the irises' image data is attached by the animal hospital and transmitted to the system for supplying custom-mixed pet food, an iris-information diagnostic means 4l
searches the diagnosis-data-prescription database 4S in the database server 4c,
automatically selects a prescription for nutrients and/or medications according to the individual pet's condition or symptoms, and
automatically specifies the food ingredients, nutrients, and medications to be mixed.

Furthermore, the predetermined format for the nutrient/medication prescription data has a space for recording the pet's blood-test data.

When the blood-test data is attached by the animal hospital and transmitted to the system for supplying custom-mixed pet food, a blood-test-data diagnosis means 4m of the custom-mixed-pet-food prescription control computer system 4
searches the diagnosis-data-prescription database 4S in the database server 4c,
automatically selects a prescription for nutrients and/or medications according to the individual pet's condition or symptoms, and
automatically specifies the food ingredients, nutrients, and medications to be mixed.

According to the present invention's system for supplying custom-mixed pet food, it is possible for a user who owns a pet to order, via the Internet from a personal computer or mobile phone, custom-mixed pet food that is prepared by mixing nutrients and/or medications suitable for his/her own pet based on a prescription sent from an animal hospital to a custom-mixed-mixture-control computer system, and for that control computer system to automatically accept and process that pet-owner's request.

Also, the control computer system can automatically request and receive a nutrients/medications prescription from the animal hospital where the pet-owner's veterinarian-in-charge works, and which animal hospital's name has previously been entered by the user on an online order form of the custom-mixed-mixture-control computer system. If the user does not regularly take his/her pet to a particular animal hospital, the pet owner can select, on the online order form, an animal hospital to be referred to, and the control computer system automatically will request and receive a nutrients/medications prescription from the animal hospital selected by the user on the online order form, so that the control computer system can receive the prescription based on the animal hospital's diagnosis of the pet.

It is possible to make the format of the order form uniform, to standardize the data and selection of required nutrients and medications, to transmit from the control computer system to the mixing device via the LAN line the entry data on forms, and thereby to obtain custom-mixed pet food in which the specified food ingredients, nutrients, medications are automatically added.

The output data of the animal hospital's iris-image-recording video camera system is entered and transmitted, and prescription data is automatically created by the iris-information diagnosis means of the individual prescription-management computer receiving that data, resulting in further reduction in the labor required at the animal hospital for diagnosis and preparation of prescriptions.

Furthermore, the blood-test data entered by the animal hospital is transmitted, and prescription data is automatically created by the blood-test-data diagnosis means of the individual prescription-management computer receiving that data, resulting in further reduction in the labor required at the animal hospital for diagnosis and preparation of prescriptions.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. A system for supplying custom-mixed pet food for mixing, with granular dried food, granular processed nutrients and medication(s) corresponding to the size, health condition, of a pet, comprising:
   a pet owner's communications terminal,
   a computer of an animal hospital to which the pet owner has been referred by someone, or an animal hospital to which the pet owner regularly takes his/her pet,
   a mixing device for mixing said nutrients and medications with food, and
   a custom-mixed-pet-food prescription control computer system having at least
      a food-order accepting means, which receives via the Internet from said pet owner's communications terminal a request for supplying custom-mixed pet-food, and which transmits an online order form to said pet owner's communications terminal,
      a pet-food-order-entry/prescription-request transmission means, which receives said online order form into which order data is entered from the pet owner's communications terminal, records said order data in a database, and transmits a prescription-entry form having a predetermined format and containing a list of nutrients and/or medication(s) to be mixed with food to a computer of a hospital specified in said online order form if the pet owner regularly takes the pet to a particular animal hospital,
      a pet owner referral/prescription-request transmission means which transmits, if the pet owner does not regularly take the pet to any animal hospital—a letter-of-referral form that refers the pet owner to a hospital selected by the pet owner, with said prescription-entry form having a predetermined format to be completed when the pet owner and his/her pet visit the hospital—to a computer of a hospital selected from a list of animal hospitals on said online order form, and
      a prescription/mixed-food data-transmission means that (a) reads—when receiving the prescription-entry form having a predetermined format for data entry from said animal hospital that the pet owner regularly visits or to which the pet owner has been referred by said online order form—selection check marks in respective item spaces at predefined positions of the prescription, then (b) records data relating to the kind and weights of the nutrients and/or medication(s) to be mixed with food by converting the data into data value, and then (c) transmits the data value to said mixing device via a LAN line, resulting in the manufacture of the custom-mixed pet food based on the data value.

2. The system, as described in claim 1, for supplying custom-mixed pet food, and wherein said mixing device comprises
   a mixing mechanism that rotates a rotary comb-like blade in normal and reverse directions for mixing,
   various food containers, from which food is put into input ports provided at the top of said mixing mechanism after said food is electronically selected according to a database record based on said pet-food order,
   a transfer mechanism that transfers said nutrients and medications to said mixing mechanism by a rotary spiral blade or an extrusion plunger, and
   various nutrient and medication containers, from which designated nutrients and/or medications are put into input ports provided at the top of said transfer mechanism after being electronically selected according to a database record based on said prescription.

3. The system, as described in claim 2, for supplying custom-mixed pet food, comprising
   said various food containers housing food by classifying the same by type, including
   a slide mechanism provided to each container at a predetermined position from the bottom of the container, allowing a partition plate to move slidably by electronic control, said plate being inserted into and out of said container, so as to separate a predetermined weight/amount of the respective food, and
   a transfer mechanism for electronically controlling the rotation of the spiral blade so as to discharge the separated food from the respective container to outside, and
   said various nutrient and medication containers housing nutrient and medication by classifying the same by type, including
   a slide mechanism provided to each container at a predetermined position from the bottom of the container, allowing a partition plate to move slidably by electronic control, said plate being inserted into and out of said container, so as to separate a predetermined weight/amount of the respective nutrient and medication, and
   a transfer mechanism for electronically controlling the rotation of the spiral blade so as to discharge the separated nutrient and medication from the respective container to outside, and
   with the rotation-controlling electronic terminals of said mixing mechanism and said transfer mechanism, and the electronic control terminals of electronically controlled slide mechanism and the transfer mechanism of the respective container of nutrient, medication and food, being connected with an interface circuit of said custom-mixed-pet-food prescription control computer system, and
   the requested custom-mixed pet food being automatically created in response to food data and prescription data transmitted from said custom-mixed-pet-food prescription control computer system.

4. The system, as described in claim 1, for supplying custom-mixed pet food, and wherein
   the predetermined format of nutrient/medication prescription data includes places for recording and attaching data of a video-camera system that records the condition of the pet's irises and the physical functioning of the pet,
   the output data of the iris-condition video-camera system in the animal hospital is entered and transmitted to said custom-mixed-pet-food prescription control computer system; and
   the prescription for nutrients and/or medication(s) according to the condition or symptoms of the individual pet is automatically selected by an iris-information diagnostic means of said custom-mixed-pet-food prescription control computer system that receives said iris-condition information and then is recorded in said computer system's database.

5. The system, as described in claim 1, for supplying custom-mixed pet food, and wherein the predetermined format for the nutrient/medication prescription data includes places for recording the blood-test data of the pet, the blood-test data entered by the animal hospital is transmitted to said custom-mixed-pet-food prescription control computer system, and the nutrient(s) and/or medication(s) prescribed according to the condition or symptoms of the individual pet is/are automatically selected by the blood-test-information diagnostic means of said custom-mixed-pet-food prescription control computer system that receives the data, and is/are recorded in said computer system's database.

6. The system of claim 1, wherein said pet owner's communication terminal is one of a personal computer or a mobile phone.

* * * * *